United States Patent

Wisor et al.

[11] Patent Number: 5,325,800
[45] Date of Patent: Jul. 5, 1994

[54] DEVICE FOR SEALING THE SEED METER OF A VERTICALLY FOLDED PLANTING UNIT

[75] Inventors: Donald R. Wisor, Moline, Ill.; Jeffrey C. Schick, Davenport, Iowa

[73] Assignee: Deere & Company, Moline, Ill.

[21] Appl. No.: 953,444

[22] Filed: Sep. 29, 1992

[51] Int. Cl.⁵ .............................................. A01C 7/00
[52] U.S. Cl. ................................... 111/185; 221/211
[58] Field of Search ................. 111/67, 170, 177, 183, 111/184, 185, 77, 78; 221/211, 266

[56] References Cited

U.S. PATENT DOCUMENTS

| | | | |
|---|---|---|---|
| 4,162,744 | 7/1979 | Barker et al. | 111/77 |
| 4,515,291 | 5/1985 | Holmes | 221/211 |
| 4,591,167 | 5/1986 | Vossieck et al. | 277/88 |
| 4,664,290 | 5/1987 | Martin et al. | 221/211 |
| 4,836,412 | 6/1989 | Webber et al. | 221/211 |
| 4,896,616 | 1/1990 | Wintersteiger et al. | 221/211 |
| 4,898,108 | 2/1990 | McDermott | 221/211 |
| 5,058,766 | 10/1991 | Deckler | 111/77 |
| 5,082,126 | 1/1992 | Ribouleau | 221/211 |
| 5,170,909 | 12/1992 | Lundie et al. | 221/211 |

OTHER PUBLICATIONS

John Deere Advertising Brochure entitled "Accuracy Experts", cover and p. 20, published in USA, Aug. 1990.

John Deere Operator's Manual OM-H138100 Issue F8 entitled "7300 Vertical-Fold MaxEmerge 2 Planters", cover and pp. 35-37, published in USA, 1988.

Primary Examiner—Clifford D. Crowder
Assistant Examiner—Michael A. Neas

[57] ABSTRACT

A device for sealing the seed meter from the seed hopper of the agricultural planting unit when the unit is pivoted form its vertical planting configuration to its horizontal transport configuration. The device comprises a resilient and elastic sealing diaphragm that is located in the seed meter across from the seed meter disc. A pivotable frame is located in the other side of the diaphragm away from the seed meter disc and is used to expand the diaphragm so that it contacts the seed meter disc and seals the seed meter form the seed hopper. A counterweight is mounted to the pivotable frame for automatically pivoting the frame and sealing the seed meter when the planting unit is moved from its vertical planting configuration to its horizontal transport configuration.

5 Claims, 4 Drawing Sheets

DEVICE FOR SEALING THE SEED METER OF A VERTICALLY FOLDED PLANTING UNIT

BACKGROUND OF THE INVENTION

1. Field of the Invention

The invention is directed to a device for sealing the seed meter of a planting unit to prevent seeds from passing from the seed reservoir to the seed discharge area when the planting unit is lifted into a horizontal transport position by a vertically folding toolbar.

2. Description of the Prior Art

Agricultural planters plant seeds in rows for later harvesting. Typically a planter comprises a number of individual planting units that are arranged along an elongated toolbar that is towed behind a tractor. Each planting unit plants a single row of seeds and is provided with a seed meter for controlling the rate at which seeds are deposited into a seed trench. To increase farmer efficiency, toolbars have gotten longer and longer and are provided with more and more planting units.

Although large planters with many planting units can plant large acreage in a short period of time, it can be difficult to transport the planter to and from the field to be planted. As such, relatively long toolbars need to be folded to make them more easily transported. One means of folding a toolbar is to vertically fold the outer wings so that they extend vertically upward from the toolbar.

The assignee of the present patent application presently markets a 7300 Vertical-Fold Planter having wings that fold vertically. This planter maybe provided with either eight or twelve individual planting units. In the eight row configuration, each vertically folded wing is provided with two planting units, and a stationary center section that is provided with four planting units. As the wings are pivoted vertically, the planting units pivot from a vertical planting configuration into a horizontal transport configuration.

Manufacturers of vertically folding planters recommend that the operator either remove the hopper/seed meter assembly or empty seed from the planting units on the wings before folding the wings and moving the planting units into the horizontal transport configuration. This prevents seed leakage through the seed meter, and poor operation of the seed meter by overloading the seed meter when the seed meter is initially operated after transport.

SUMMARY

It is an object of the present invention to provide a means for sealing the seed meter when a planting unit is pivoted from its vertical planting configuration into its horizontal transport configuration to prevent seeds in the seed reservoir from passing into the seed discharge area of the seed meter.

The means for automatically sealing the seed meter comprises a resilient and elastic diaphragm that is positioned on the opposite side of the seed meter from the seed meter disc. A means for expanding the diaphragm against the seed meter disc is located behind the diaphragm and comprises a pivotable frame. The pivotable frame is pivoted by a means for automatically pivoting the frame when the planting unit is moved into its transport configuration. The means for automatically pivoting comprises a counterweight that is coupled to the pivotable frame which pivots the frame thereby deforming the diaphragm and sealing the seed meter, when the planting unit is shifted into its horizontal transport configuration.

DETAILED DESCRIPTION

Figure 1:
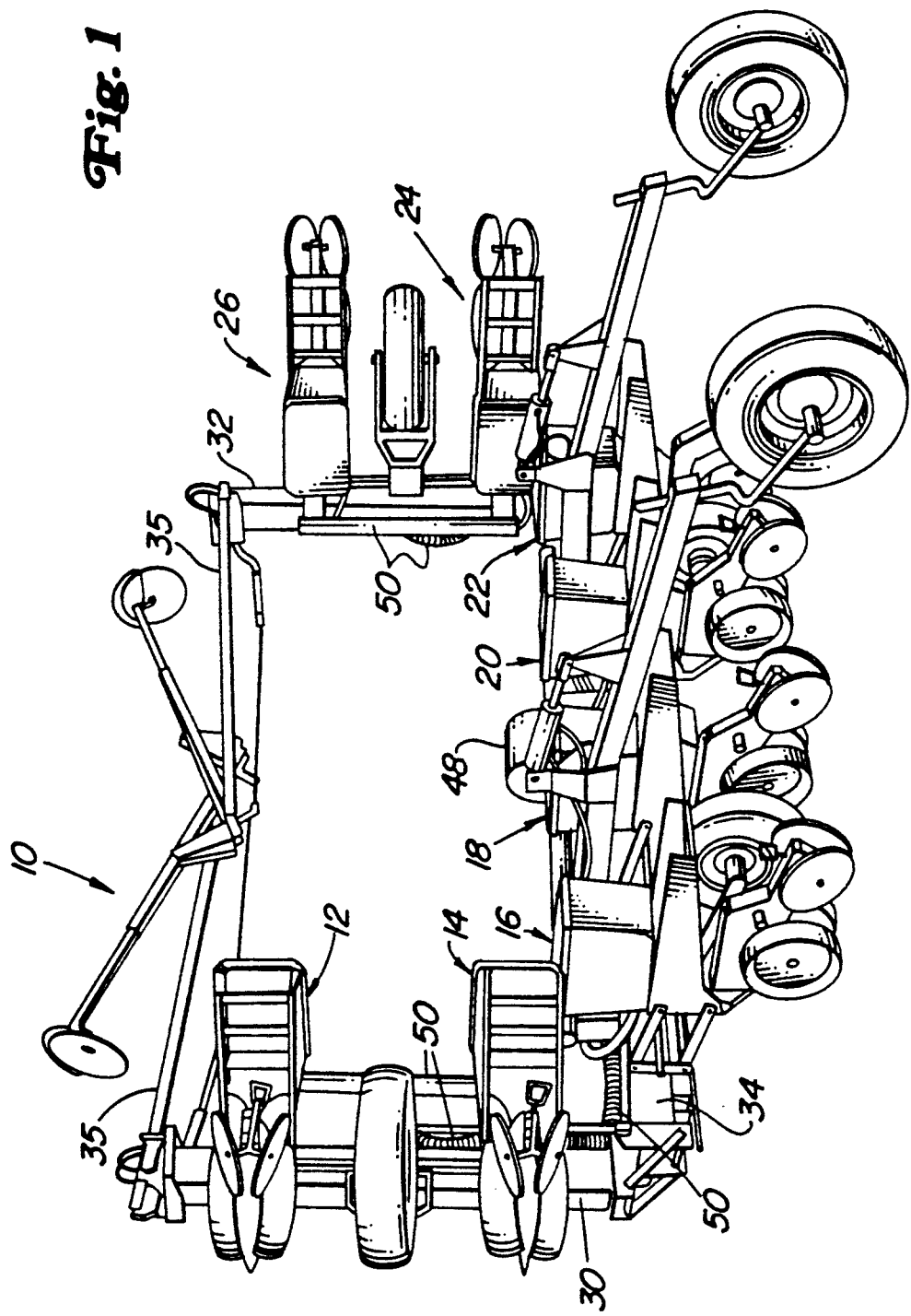
FIG. 1 is a rear perspective view of a vertical fold agricultural planter having eight planting units.

FIG. 1 is a rear view of a vertical fold agricultural planter 10 having eight planting units 12, 14, 16, 18, 20, 22, 24 and 26 that are mounted to a vertical fold toolbar. The toolbar has two wings 30 and 32 and a center section 34. In its planting configuration the wings 30 and 32 of the toolbar are in line with center section 34. In its transport configuration, illustrated in FIG. 1, the wings are folded vertically to reduce the overall width of the planter so the planter can be more easily transported through gates and down roads. The end of each wing is provided with a row marker 35.

The four center planting units 16, 18, 20 and 22 are conventional planting units, such as the applicant's MaxMerge 2 planting units. The four end planting units 12, 14, 24 and 26 are identical to the center planting units except for the present invention.

Each planting unit is provided with a seed hopper 36 having a lid 38 for holding seed to be planted, a seed meter 40 for controlling the rate at which seeds are deposited into the seed trench, a furrow opener 42 for forming the seed trench, and closing wheels 43 for closing the seed trench. The seed meters, on the illustrated planting units, are vacuum meters in which a vacuum is applied to the back side of a seed meter disc 44. The seed meter disc picks up single seeds from a puddle of seeds located in the seed reservoir 46 of the seed meter. The vacuum is generated by vacuum 48 located on the center section of the toolbar and is applied to the seed meters through vacuum hoses and pipes 50 that are coupled to the seed meters at 52.

Figure 2:
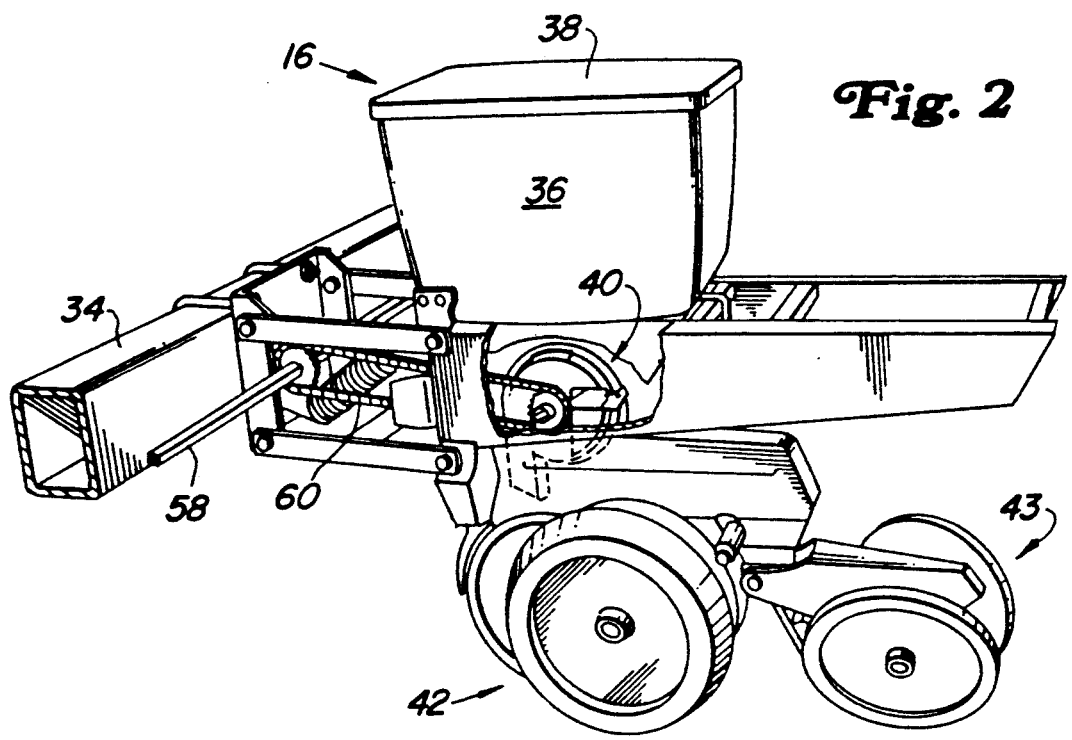
FIG. 2 is a perspective cut away view of a planting unit.

During planting operations, seeds from the seed hopper 36 are directed to the seed meter through a seed reservoir 46. The seed meter disc 44 rotates through the puddle of seeds formed in the seed reservoir. Individual seeds are picked up from the puddle of seeds formed in the seed reservoir in seed pockets 51 formed on the disc. Each seed pocket is provided with an aperture 53 through which a vacuum is drawn holding the seed in the seed pocket. The seed meter disc rotates the held seeds out of the puddle into the seed discharge area 55 of the seed meter where they are deposited into seed tube 56 by releasing the vacuum applied to the seeds. Brush 54 extends across the seed meter to prevent seeds from flowing from the puddle into the seed tube and defines the discharge area of the seed meter. The seed tube 56 directs the seeds to the seed trench formed by furrow opener 42. The closing wheels 43 close the seed trench around the seed. The seed meter is driven by drive shaft 58 through chain drive 60, best illustrated in FIG. 2.

Figure 5R:
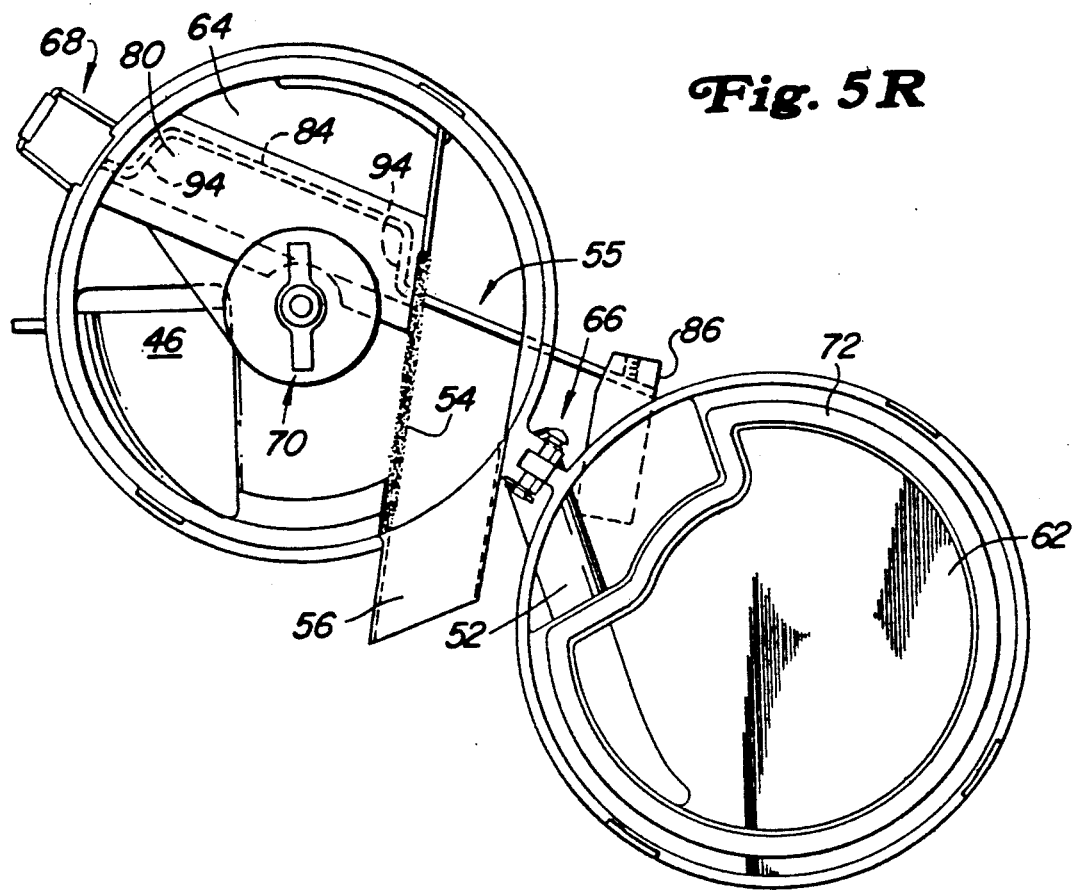
FIGS. 5L and 5R are side views of a hinged opened seed meter for the left and right folding wings, respectively.
Figure 4:
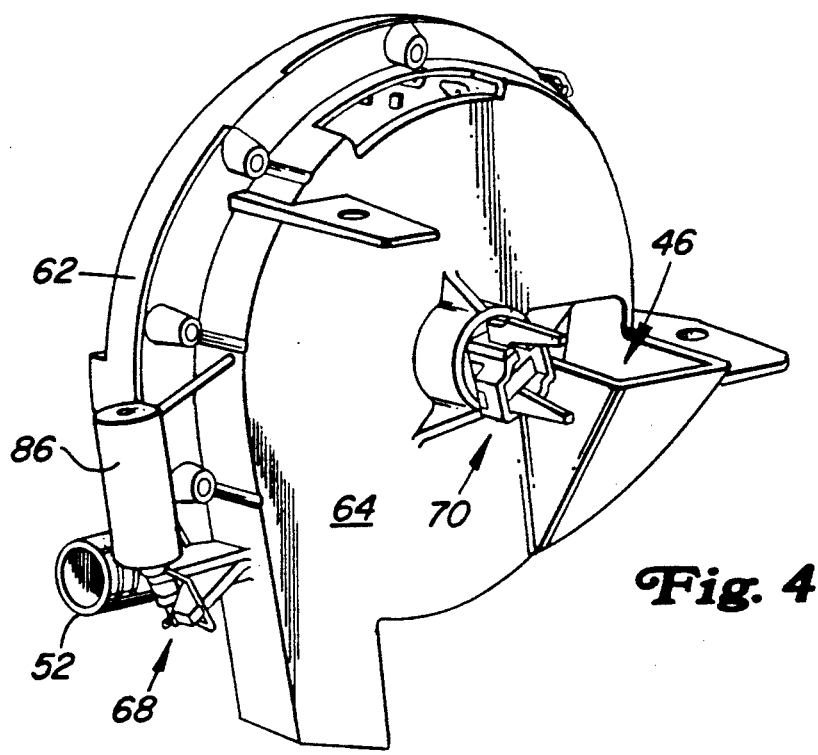
FIG. 4 is a perspective view is a seed meter.
Figure 5L:
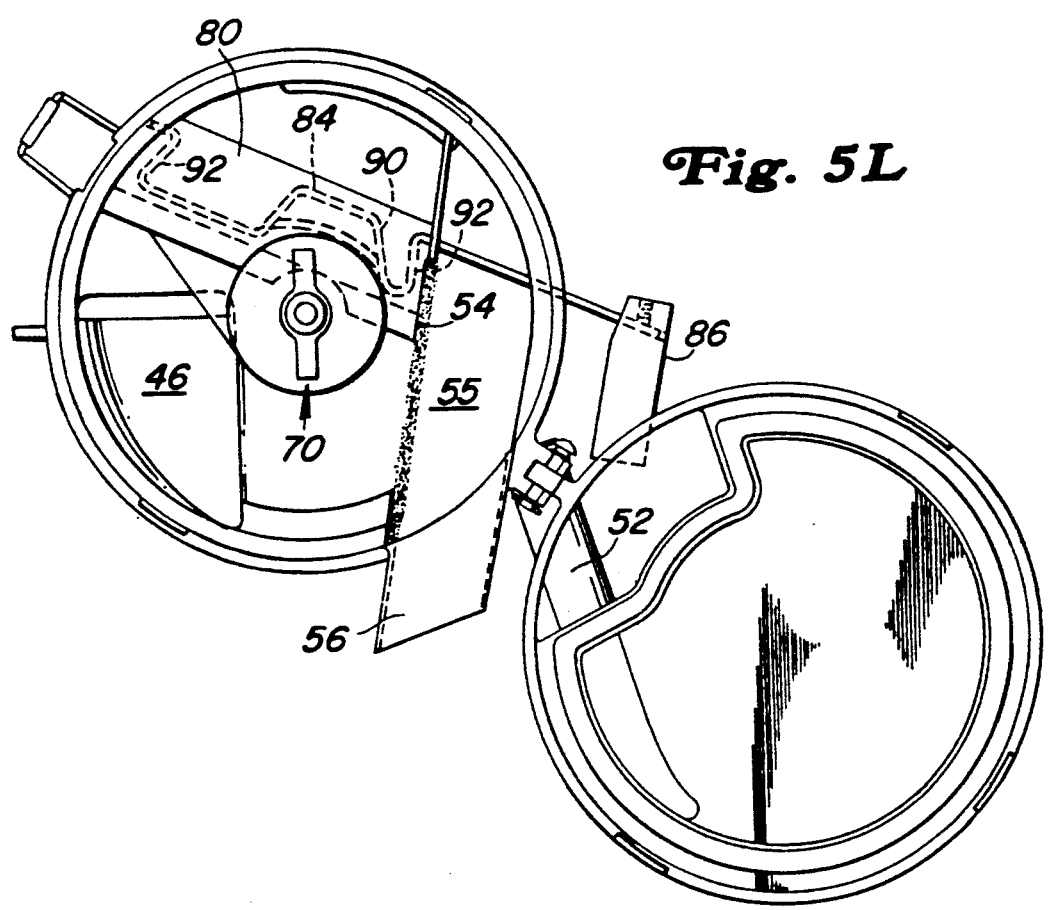

As illustrated in FIGS. 4, 5L and 5R, the seed meter comprises two half members 62 and 64 that are hinged together at 66. A latching mechanism 68 holds the half members together. The seed meter disc 44 is mounted to seed meter drive hub 70 which is rotated by chain drive 60. A seal 72 is located about the periphery of half member 62 for maintaining the vacuum received from the vacuum 48 through pipe stub 52. The present invention is mounted to half member 64.

Figure 3L:
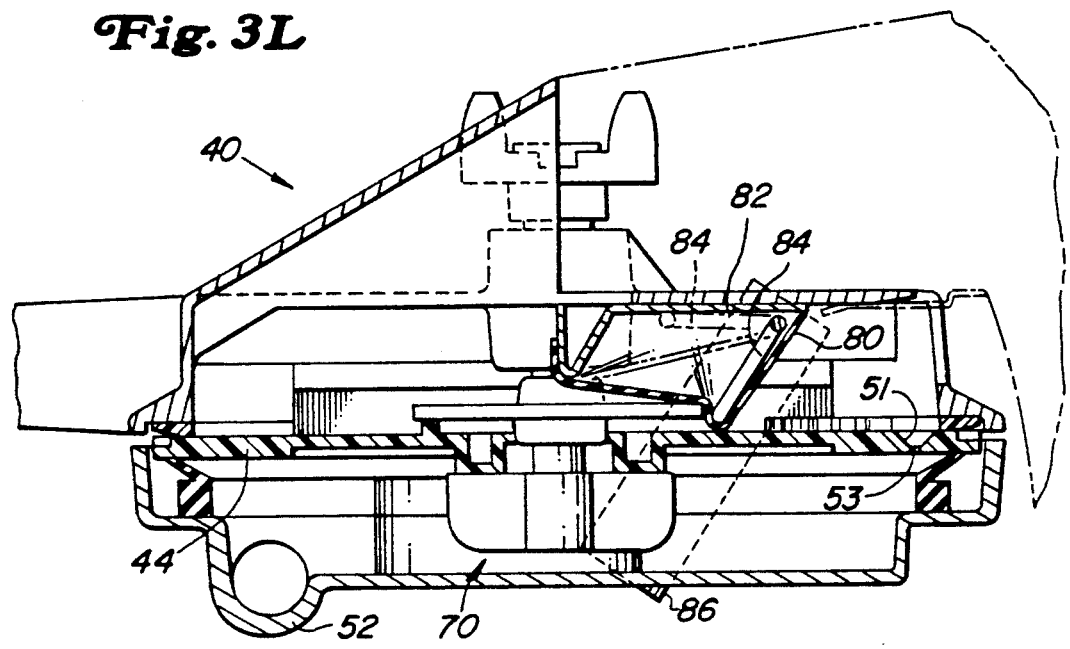
FIGS. 3L and 3R are cross sectional views of the a seed meter on the left folding wing and the right folding wing, respectively.
Figure 3R:
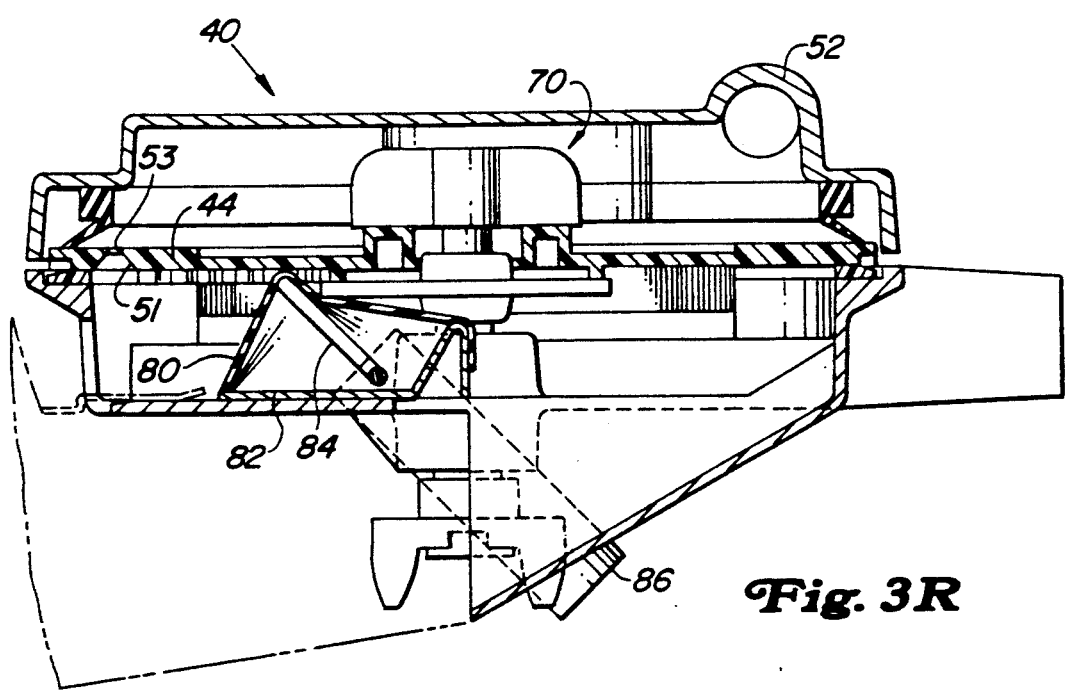

The present invention is directed to a means for automatically sealing the seed meter to prevent seeds from the seed reservoir from entering the seed discharge area when the wings of the toolbar rotate the planting units from a vertical planting configuration into a horizontal transport configuration. This means comprises a resilient and elastic diaphragm 80 mounted to the seed meter opposite the seed meter disc 44. The diaphragm is secured to an insert 82 mounted on the opposite wall of the seed meter. The insert is secured to the opposite wall by screws or other suitable means, and the resilient and elastic sealing diaphragm is secured to the insert by adhesives and/or mechanically by clamping bars. The unexpanded condition of the diaphragm is illustrated in phantom lines in FIG. 3L. In its unexpanded condition the diaphragm forms a smooth planar surface.

A means for expanding the diaphragm against the seed meter disc is located on the other side of the diaphragm away from the seed meter disc. This means comprises a pivotable frame 84 that is pivotally mounted to the seed meter. The pivotable frame and can be forced against the diaphragm expanding the diaphragm outwardly into contact with the seed meter disc, thereby sealing the reservoir of the seed meter from the discharge area of the seed meter.

The pivotable frame maybe provided with a means for automatically pivoting the pivotable frame when the planting unit is shifted from a vertical planting position to a horizontal transport position. This means comprises a counterweight 86 that is mounted to the pivotable frame. Whenever the planting unit is raised into its horizontal transport position the counterweight pivots the pivotable frame against the diaphragm, expanding the diaphragm against the seed meter disc and sealing the seed meter reservoir from the seed meter discharge area. The means for automatically pivotting the pivotable frame forms the means for automatically sealing the seed meter. Alternatively, the pivotable frame maybe provided with a handle for manually pivotting the pivotable frame and sealing the discharge area of the seed meter.

As illustrated in FIGS. 5L and 5R, the pivotable frame is different for the seed meters mounted to the left and right wings of the toolbar. When the planting units are pivoted from the vertical planting configuration to the horizontal transport configuration, the counterweight pivots the pivotable frame to the left or right depending upon which wing the respective planting unit is mounted. As the seed meters are identical it is necessary to modify the structure of the pivotable frame and its mounting location. For example, the pivotable frame of the seed meters for the left wing planting units, illustrated in FIG. 5L, is provided with a semi-circular portion 90 to accommodate the seed meter drive hub. In addition, the bell crank portion 92 of this pivotable frame is pointed downwardly. The pivotable frame for the seed meters for the right wing planting units, illustrated in FIG. 5R, is not provided with a semi-circular portion, and its bell crank portion 94 is pointed upwardly.

The invention should not be limited by the above-described embodiments, but should be limited solely by the claims that follow.

We claim:

1. An agricultural planter comprising:
    a toolbar that can be pivoted from a horizontal planting position to a vertical transport position;
    a planting unit is mounted to the toolbar, the planting unit having a vertical planting configuration and a horizontal transport configuration, the planting unit is provided with a seed hopper for holding seed, a seed meter for controlling how fast seed is planted by the planter unit, the seed meter is provided with a seed reservoir, a discharge area and a seed meter disc, a furrow opening for opening and closing a seed trench for receiving the seed, and means for sealing the seed meter to prevent seeds from the seed reservoir from entering the seed discharge area when the toolbar is rotated, thereby rotating the planting unit from a vertical planting configuration into a horizontal transport configuration, the means for sealing the seed meter comprises a resilient and elastic sealing diaphragm positioned across from the seed meter disc and a means for expanding the diaphragm against the seed meter disc, so that the diaphragm contacts the seed meter disc thereby sealing the seed meter to prevent seeds from the seed reservoir from entering the seed discharge area.

2. A planter as defined by claim 1 wherein the means for expanding comprises a pivotable frame located on the other side of the diaphragm from the seed meter disc which expands the diaphragm outwardly against the seed meter disc.

3. A planter as defined by claim 2 wherein the pivotable frame is provided with a means for automatically pivoting the pivotable frame when the planting unit is shifted from a vertical planting position to a horizontal transport position.

4. A planter as defined by claim 3 wherein the means for counterweight that is mounted to the pivotable frame.

5. An agricultural planter comprising:
    a toolbar that can be pivoted from a horizontal planting position to a vertical transport position;
    a planting unit is mounted to the toolbar, the planting unit having a vertical planting configuration and a horizontal transport configuration, the planting unit is provided with a seed hopper for holding seed, a seed meter for controlling how fast seed is planted by the planter unit, the seed meter is provided with a seed reservoir, a discharge area and a seed meter disc, a furrow opening for opening and closing a seed trench for receiving the seed, and means for automatically sealing the seed meter to prevent seeds from the seed reservoir from entering the seed discharge area when the toolbar is rotated, thereby rotating the planting unit from a vertical planting configuration into a horizontal transport configuration.

* * * * *

UNITED STATES PATENT AND TRADEMARK OFFICE
CERTIFICATE OF CORRECTION

PATENT NO. : 5,325,800

DATED : 5 July 1994

INVENTOR(S) : Donald R. Wisor et al.

It is certified that error appears in the above-identified patent and that said Letters Patent is hereby corrected as shown below:

column 4 line 20, delete "opening" (1st occurr.) and insert --opener--.

column 4 line 46, after "for" insert --automatically pivoting the pivotable frame comprises a--.

column 4 line 58, "opening" (first occurance) delete and insert --opener--.

Signed and Sealed this

Thirteenth Day of December, 1994

*Attest:*

BRUCE LEHMAN

*Attesting Officer*  *Commissioner of Patents and Trademarks*